United States Patent [19]
King

[11] Patent Number: 5,642,655
[45] Date of Patent: Jul. 1, 1997

[54] APPARATUS FOR ADVANCING FILTER TAPE IN A BEVERAGE BREWER, 'WINDOW BLIND' DESIGN

[76] Inventor: Alan M. King, 465 Cote St. Antoine Rd., Westmount, Canada, H3Y 2K1

[21] Appl. No.: 639,735

[22] Filed: Apr. 29, 1996

[51] Int. Cl.⁶ .................................................. A47J 31/24
[52] U.S. Cl. ............................................ 99/289 T; 99/297
[58] Field of Search .................. 99/279, 287, 289 R, 99/289 T, 297; 426/433

[56] References Cited

U.S. PATENT DOCUMENTS

| | | | |
|---|---|---|---|
| 4,632,023 | 12/1986 | King | 99/289 T |
| 4,791,859 | 12/1988 | King | 99/289 T |
| 4,903,586 | 2/1990 | King | 99/287 |
| 5,515,772 | 5/1996 | Groen | 99/289 T |

*Primary Examiner*—Robert W. Jenkins
*Attorney, Agent, or Firm*—Hill, Steadman & Simpson

[57] ABSTRACT

A device for brewing fresh coffee or tea from dry ingredients which uses a flexible moveable screen to filter the brewed coffee or tea and dispose of the used grounds at the completion of each cycle.

5 Claims, 3 Drawing Sheets

APPARATUS FOR ADVANCING FILTER TAPE IN A BEVERAGE BREWER, 'WINDOW BLIND' DESIGN

BACKGROUND OF THE INVENTION

1. Field of the Invention

This invention relates in general to beverage brewers and in particular to a novel apparatus for advancing coffee tape.

2. Description of Related Art

This invention is an improvement on my prior U.S. Pat. Nos. 4,974,751, 4,632,023, and 4,903,586. In coffee brewers of this type described in patent U.S. Pat. No. 4,903,586, coffee is brewed by drawing hot water through a filter upon which the coffee is supported and after brewing the filter is moved to dispose of the coffee. Various methods are known for disposing of the used coffee.

SUMMARY OF THE INVENTION

The present invention provides novel apparatus for advancing a coffee filter tape in a coffee brewing machine, and in particular, to a mechanism driven by a brewing motor which positively removes the tape thus scraping the used coffee from the tape, and returns the tape to the start position, ready for the next cycle.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
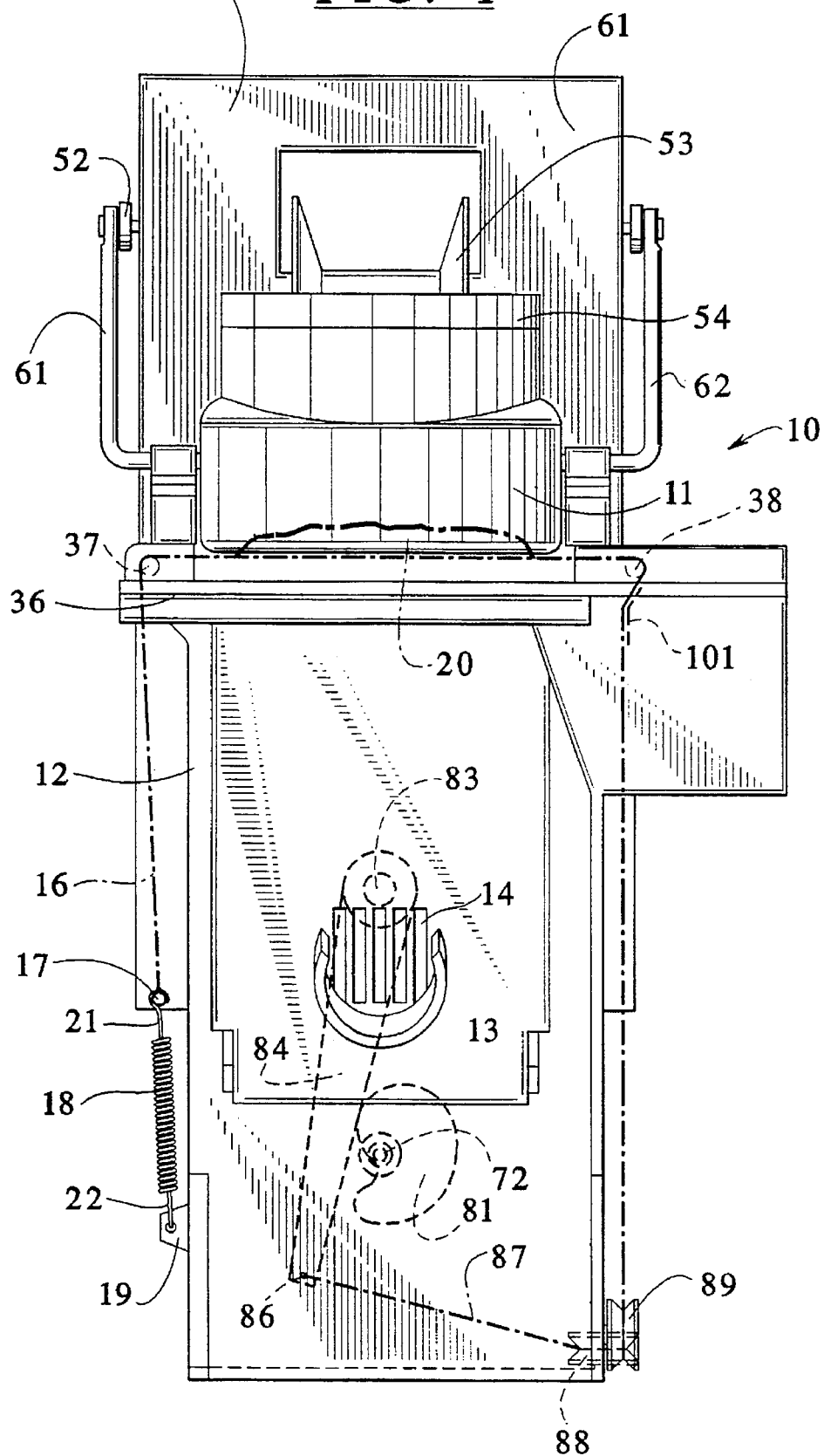
FIG. 1 is a front plan view of the coffee brewer of the invention.

FIG. 1 is a front plan view of a coffee brewer 10 which has an upper brewing chamber 11 and a lower brewing chamber 12 which are periodically separated during the brewing cycle. A sprout 13 in the main cylinder periodically supplies brewed coffee to a cup for the user through openings 14 which are formed in the main cylinder to allow the coffee to emerge from the main cylinder.

A hot water tank 51 has a spout 53 which supplies hot water into the funnel 54 located in upper brewing chamber 11. The hot water mixes with coffee 20 which is periodically placed on the movable flexible filter tape 16 above the main cylinder 12. The water/coffee mixture is agitated during the upstroke of the piston 79 shown in FIG. 2 which is connected to arm 78 that has its opposite end pivoted by a pin 77 to a crank arm 76 mounted on the output shaft 72 of a motor 71. On the downstroke of the piston, the resultant vacuum draws the brewed coffee through the coffee grounds 20 and the filter tape 16 into the main cylinder 12. When the piston passes the openings 14 which are formed in the main cylinder 12, the brewed coffee then pours from the main cylinder 12 into the waiting cup.

The upper brewing chamber 11 is periodically unclamped from the tape 16 and the lower main cylinder 12 by movement of a shaft 200 which is driven by a cam on shaft 72. Shaft 200 is connected to an arm 202 by connector 201 and moves arm 202 which is pivotally connected by pin 210 to the brewer main frame 211 mounted to the main cylinder 12. The other end of arm 202 is connected to a projection 203 on upper coffee brewing chamber 11 so as to periodically to move it up and down as described in my issued U.S. Pat. No. 4,903,586.

Figure 2:
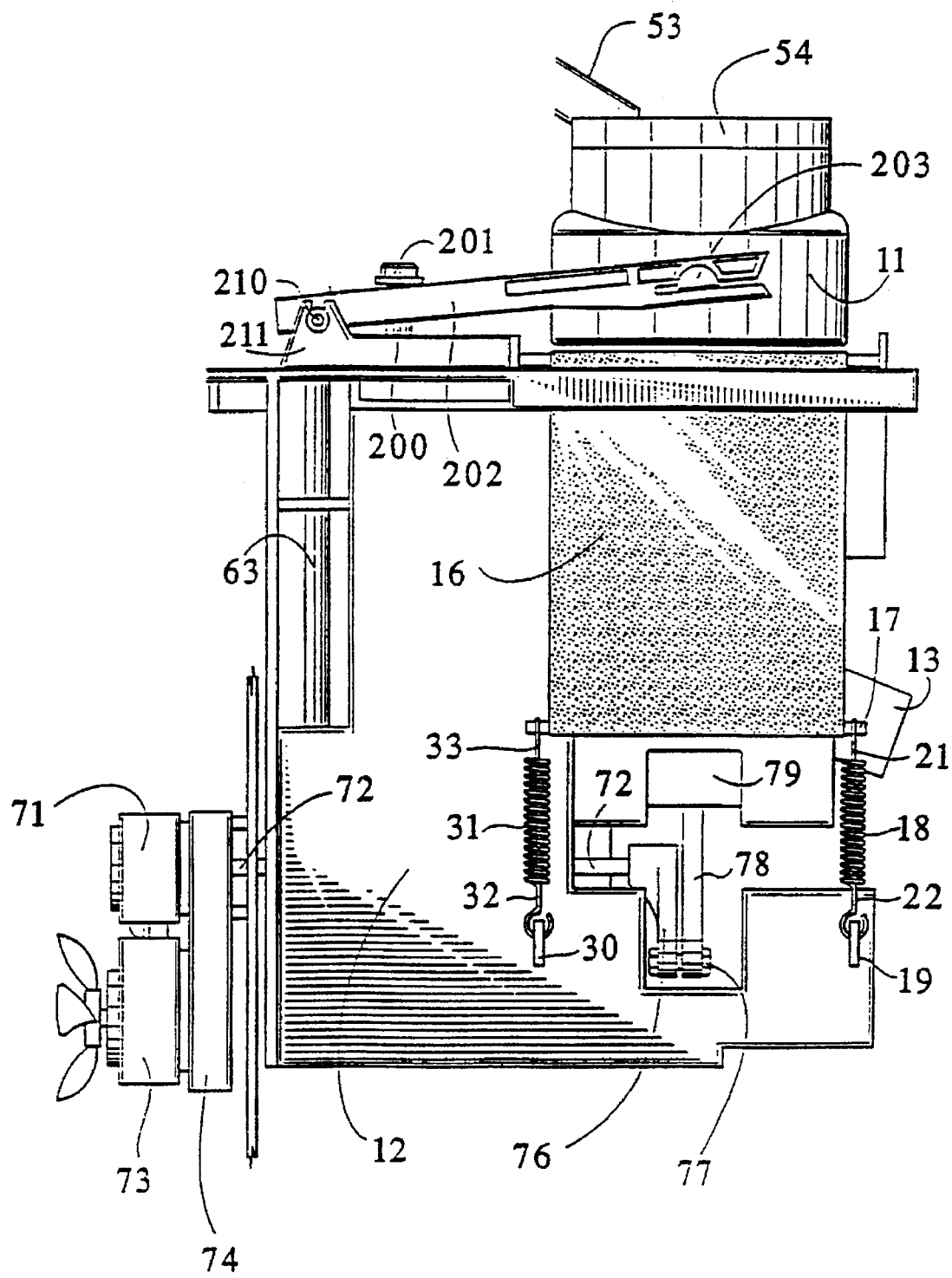
FIG. 2 is a side plan view illustrating the invention.
Figure 3:
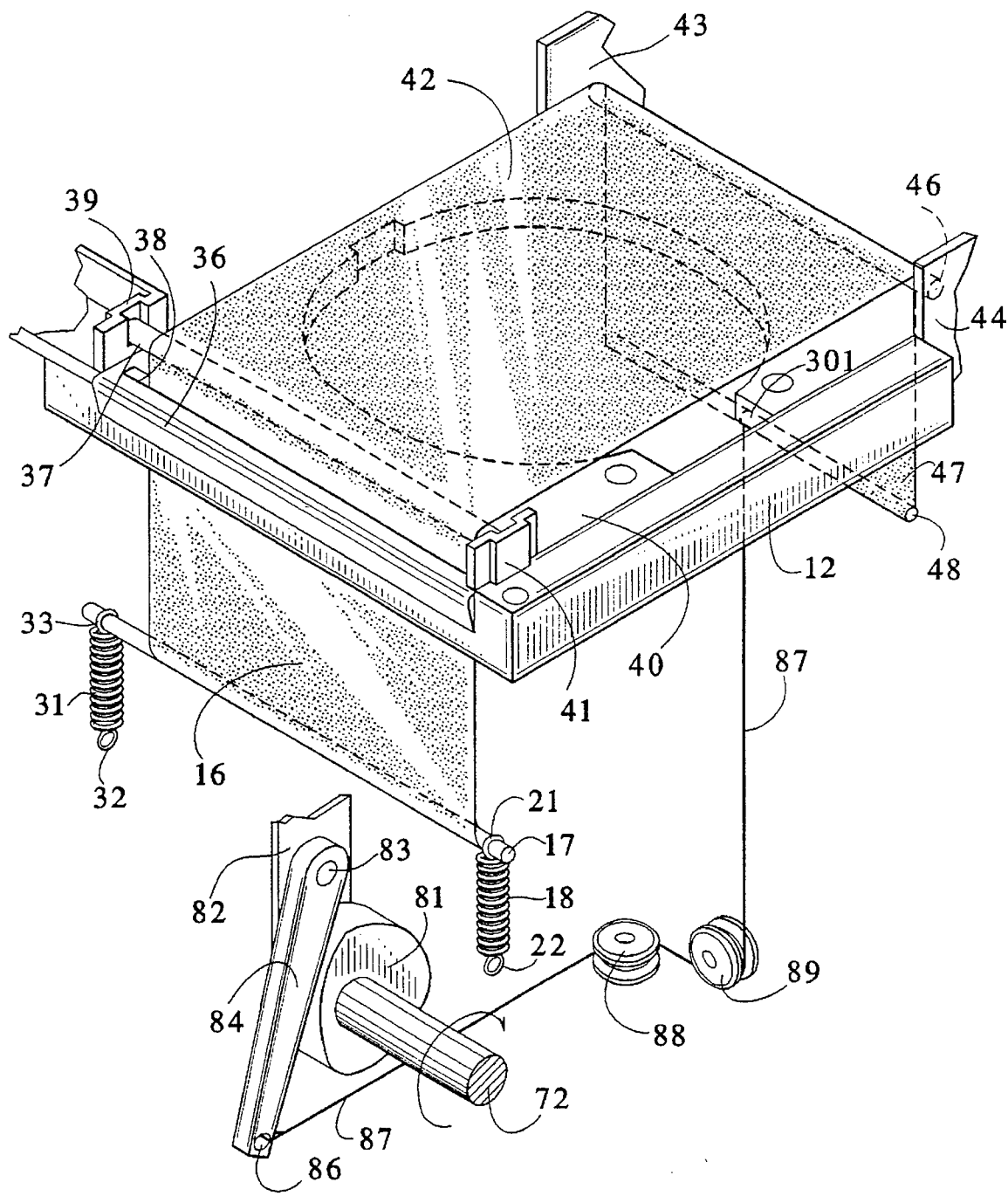
FIG. 3 is a perspective view illustrating the tape actuating mechanism.

The novel apparatus for advancing the filter tape 16 and cleaning and returning it to its initial position is illustrated in perspective in FIG. 3. A screen support 40 is mounted on the upper portion of the main cylinder 12 over which is a screen 42. The porous flexible tape 16 passes over the screen 42 of screen support 40 over roller shafts 37 and 46 rotatably mounted in brackets 39 and 41 and 43 and 44 attached to the main cylinder 12. One end of the filter tape 16 is attached to a shaft 17 which has its opposite ends engaged by springs 18 and 31 which have ends 21 and 33 that pass over the shaft 17. The opposite ends 22 and 32 of the springs 18 and 31 are connected to brackets 19 and 30 as illustrated in FIGS. 1 and 2 so as to bias the filter tape 16 to the position shown in FIG. 2.

The opposite end 47 of the filter tape 16 is connected to a shaft 48. A flexible line 87 has one end 301 connected to the mid-point of shaft 48 and passes over a first pulley 89 rotatably connected to the main cylinder 12 and then over a second pulley 88 mounted by a pivot pin to the main cylinder 12. The line 87 then connects to an opening 86 in a pivot arm 84 which has its upper end connected by a pivot pin 83 to a bracket 82 on the brewer main frame 21. A cam 81 is mounted on the motor shaft 72 and as the motor 71 rotates, the cam 81 moves the lever arm 84 so as to pull the end 47 of the filter tape 16 downwardly relative to FIGS. 1, 2 and 3 so as to move the filter tape 16 to carry the used coffee grounds 20 outside of the brewing chamber and under a scraper 101 which removes the used coffee from the tape so that it can drop from the machine. It is to be realized that the cam 81 and lever 84 move the filter tape 16 and the coffee grounds 20 out of the brewing chamber during a time when the upper main cylinder 11 is separated from the lower brewing chamber 12 by the arm 202. After the arm 84 and cam 81 have moved forward the portion of the filter tape 16 upon which the used coffee grounds lie, the scraped filter tape is then reversed back to its original position over the brewing chamber by the bias of springs 18 and 31 as the cam 81 releases the arm 84. Subsequently, the upper brewing chamber 11 is clamped to the main cylinder 12 in preparation for the next brewing cycle during which fresh coffee and hot water will again be supplied to the brewing machine for the next brewing cycle.

It is seen that this invention provides a new and novel apparatus for advancing and returning the filter tape in a beverage brewer and although the invention has been described with respect to preferred embodiments, it is not to be so limited as changes and modifications can be made which are within the full intended scope of the invention as defined by the appended claims.

I claim as my invention:

1. A beverage brewing machine comprising in combination, an upper brewing chamber adapted to receive hot water and a beverage material and having an open lower end, a lower chamber with an lower open upper end normally in registration and sealed with said open end, a movable flexible filter tape mounted between said upper and lower chambers and said chambers normally clamping said portion therebetween, a reciprocable piston mounted in said lower chamber for forcing air through said filter into said upper chamber and then providing negative pressure to withdraw brewed beverage through said filter into the lower chamber and is then expelled by gravity into the awaiting cup, means for separating and sealing said upper and lower chambers so as to unclamp said filter, where said piston is driven by a connecting rod which has one end pivotally connected thereto, a crank arm pivotally connected to the second end of said connecting rod, a driving shaft connected to said crank arm, and a driving means connected to said driving shaft, and means for moving said filter tape when it is unclamped including spring biasing means connected to one end of said tape, and filter tape pulling means attached to the other end of said tape.

2. A beverage machine according to claim 1 wherein said filter tape pulling means comprises a cam mounted on said driving shaft, an arm pivotally connected to said lower chamber and engageable with said cam, and a flexible line connected to said arm and to said second end of said filter tape.

3. A beverage machine according to claim 2 wherein said tape pulling means includes at least one pulley over which said flexible line passes rotatably mounted to said lower main cylinder.

4. A beverage machine according to claim 3 wherein said tape pulling means includes a second pulley over which said flexible line passes rotatably mounted on said lower main cylinder.

5. A beverage machine according to claim 1 including a scraper engageable with said filter tape to remove used coffee therefrom.

* * * * *

UNITED STATES PATENT AND TRADEMARK OFFICE
CERTIFICATE OF CORRECTION

PATENT NO. : 5,642,655
DATED : July 1, 1997
INVENTOR(S) : Alan M. King

It is certified that error appears in the above-indentified patent and that said Letters Patent is hereby corrected as shown below:

Column 1, line 67, "tape 16" should read --filter tape 16--.

Column 2, line 29, change "main frame 21" to read --main frame 211--.

Column 2, line 36, change "tape" to read --filter tape--.

Column 2, line 39, change "upper main cylinder 11" to read --upper brewing chamber 11".

Column 2, line 40 "brewing chamber 12" should read --"main cylinder 12"--.

Signed and Sealed this

Third Day of November, 1998

Attest:

Attesting Officer

BRUCE LEHMAN

Commissioner of Patents and Trademarks